United States Patent

Beard

[11] Patent Number: 5,975,508
[45] Date of Patent: Nov. 2, 1999

[54] ACTIVE VEHICLE SEAT SUSPENSION SYSTEM

[75] Inventor: Andrew M. Beard, Winchester, Mass.

[73] Assignee: Applied Power Inc., Butler, Wis.

[21] Appl. No.: 08/909,298

[22] Filed: Aug. 11, 1997

Related U.S. Application Data

[63] Continuation-in-part of application No. 08/781,756, Jan. 10, 1997, Pat. No. 5,725,066, which is a continuation of application No. 08/525,432, Sep. 6, 1995, Pat. No. 5,603,387.

[51] Int. Cl.⁶ .......................... B62D 24/04; B62D 33/10
[52] U.S. Cl. .......................... 267/136; 188/378; 267/131; 267/64.24; 280/124.157; 296/190.07; 180/89.12; 248/550
[58] Field of Search ..................... 267/131, 136, 267/218, 117, 64.24; 180/89.12, 89.14; 280/124.16, 124.157; 296/190.07, 190.01, 65.02; 248/550, 556; 188/378, 379, 380, 266.1, 266.2, 282.2, 282.3; 701/37, 38, 49

[56] References Cited

U.S. PATENT DOCUMENTS

| | | | |
|---|---|---|---|
| 3,701,499 | 10/1972 | Schubert et al. | 244/17.27 |
| 3,807,678 | 4/1974 | Karnopp et al. | 248/358 R |
| 4,294,324 | 10/1981 | Kimball et al. | 296/190 |
| 4,502,673 | 3/1985 | Clark | 267/64.24 |
| 4,742,998 | 5/1988 | Schubert | 267/136 |
| 4,757,980 | 7/1988 | Schubert | 267/136 |
| 4,796,873 | 1/1989 | Schubert | 267/136 |
| 4,838,392 | 6/1989 | Miller et al. | 188/277 |
| 4,871,189 | 10/1989 | Van Breemen | 180/89.12 |
| 4,887,699 | 12/1989 | Ivers et al. | 188/378 |
| 4,898,264 | 2/1990 | Miller | 188/275 |
| 4,907,680 | 3/1990 | Wolfe et al. | 188/299 |
| 4,921,272 | 5/1990 | Ivers | 280/707 |
| 4,936,425 | 6/1990 | Boone et al. | 188/299 |
| 4,953,089 | 8/1990 | Wolfe | 364/424.05 |
| 4,989,684 | 2/1991 | Conaway | 180/89.15 |
| 4,993,523 | 2/1991 | Schwemmer et al. | 188/299 |
| 5,004,079 | 4/1991 | Ivers et al. | 188/282 |
| 5,044,455 | 9/1991 | Tecco et al. | 180/89.13 |
| 5,109,939 | 5/1992 | Conaway et al. | 180/89.15 |
| 5,174,552 | 12/1992 | Hodgson et al. | 267/140.11 |
| 5,253,853 | 10/1993 | Conaway et al. | 267/256 |
| 5,299,651 | 4/1994 | Wilson | 180/89.12 |
| 5,358,305 | 10/1994 | Kaneko et al. | 267/131 |
| 5,390,121 | 2/1995 | Wolfe | 364/424.05 |
| 5,536,059 | 7/1996 | Amirouche | 267/136 |
| 5,603,387 | 2/1997 | Beard et al. | 180/89.12 |
| 5,660,255 | 8/1997 | Schubert et al. | . |
| 5,725,066 | 3/1998 | Beard et al. | 180/89.12 |
| 5,823,307 | 10/1998 | Schubert et al. | 188/378 |

FOREIGN PATENT DOCUMENTS

| | | | |
|---|---|---|---|
| 5-238435 | 9/1993 | Japan | 180/89.12 |
| 6-107242 | 4/1994 | Japan | 296/190 |
| 93/08065 | 4/1993 | WIPO | 296/190 |
| 93/19973 | 10/1993 | WIPO | 296/190 |

*Primary Examiner*—Douglas C. Butler
*Attorney, Agent, or Firm*—Quarles & Brady LLP

[57] ABSTRACT

A seat of a vehicle is connected to the vehicle body by a support linkage that enables movement of the seat. A hydraulic actuator is connected between the seat and the vehicle body to produce motion which counteracts the influence of the vehicle body movement on the seat. An air bag, coupled between the seat and vehicle body, has a variable spring preload to compensate for differing masses placed on the seat. A motion sensor detects movement of the seat and a displacement sensor detects seat displacement. A force sensor detects a force exerted on the actuator by an operator sitting in the seat. A controller responds to the motion and displacement sensors by operating the actuator to nullify effects of the movement of the vehicle body from acting on the seat, and responds to the force sensor by varying the spring preload of the air bag to maintain the force exerted on the actuator to within a defined range.

27 Claims, 3 Drawing Sheets

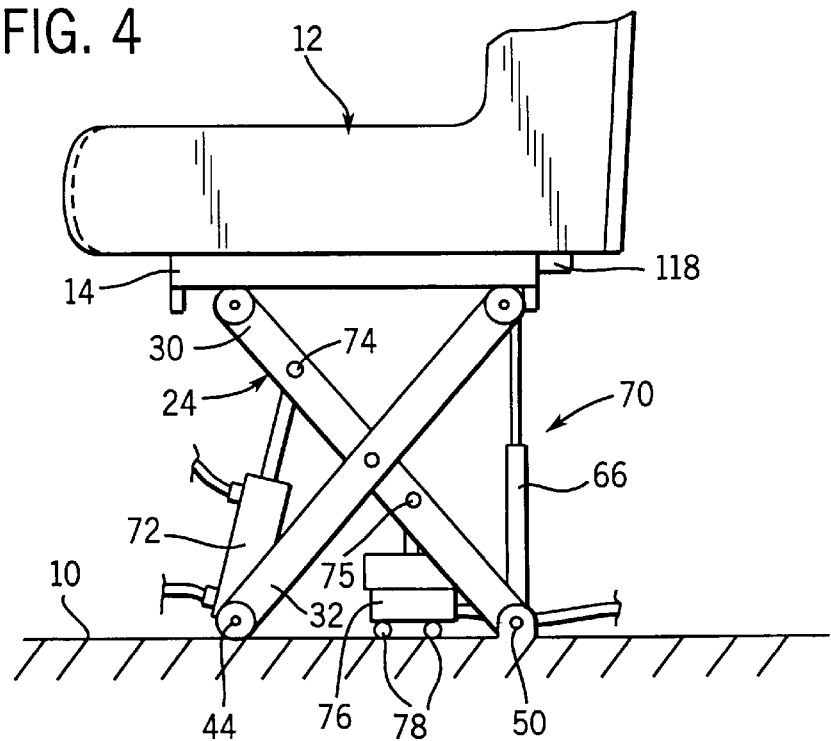
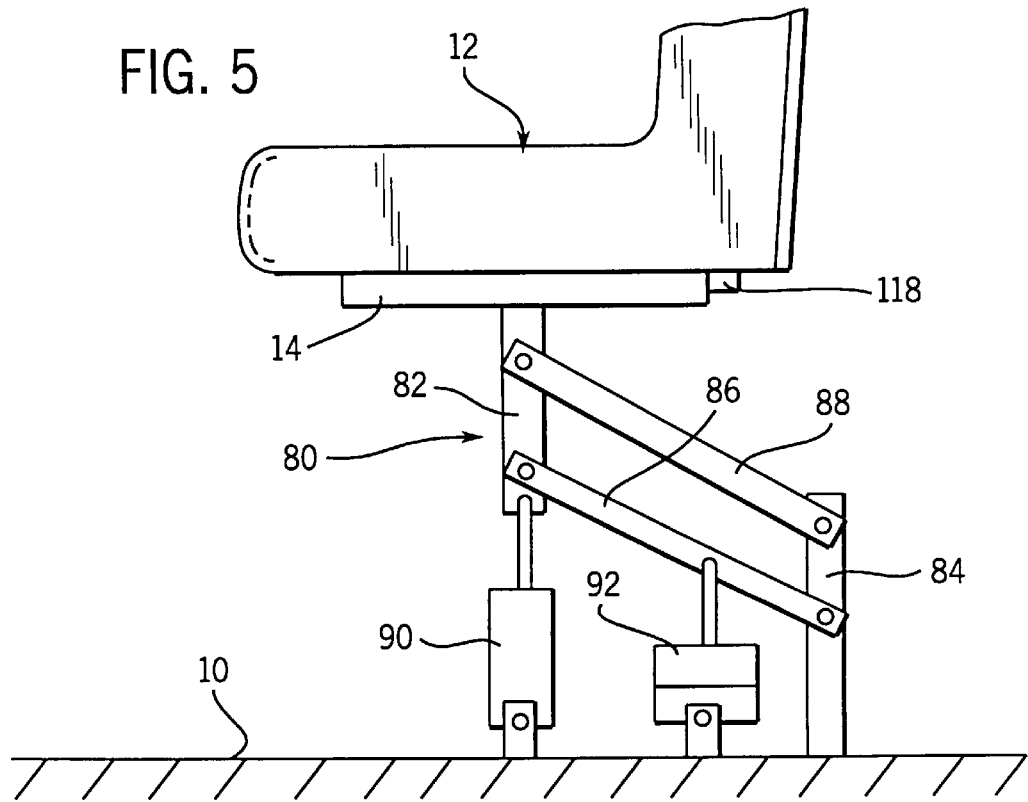

ACTIVE VEHICLE SEAT SUSPENSION SYSTEM

This application is a continuation-in-part of U.S. patent application No. 08/781,756 filed on Jan. 10, 1997 now U.S. Pat. No. 5,725,066; which is a continuation of U.S. patent application No. 08/525,432 filed on Sep. 6, 1995, now U.S. Pat. No. 5,603,387.

FIELD OF THE INVENTION

This invention relates to active suspension systems for supporting a seat of a motor vehicle; and more particularly to seat suspension systems with active vibration isolation devices, and to seat suspensions for off-road vehicles, such as agriculture and construction equipment.

BACKGROUND OF THE INVENTION

Vibration has an adverse affect on the productivity of work vehicles used in agriculture and construction in which an operator sits in a seat of a cab that is supported on a chassis. As the vehicle moves over the ground, vibration disturbances are transmitted through the vehicle components to the seat and the operator. The motion disturbances experienced by such vehicles increase operator fatigue and can result in considerable operator discomfort over sustained working periods. Thus, it is desirable to reduce operator movement by minimizing motion disturbances that otherwise are transmitted to the seat.

Motor vehicles have traditionally incorporated devices into suspension systems between the wheels and the vehicle chassis to attenuate vibration induced by the road. Additional vibration isolation devices sometimes are placed between the vehicle chassis and the cab in which the operator rides to further reduce road vibrations and engine induced vibration. Those previous suspension systems typically performed poorly in the frequency range where the human body is most sensitive, i.e. one to ten hertz. When subjected to vertical movement, or bounce, the human abdomen resonates at approximately four to eight hertz while the head and eyes resonate at ten hertz. The upper torso of a person resonates in response to pitch and roll movement at between one and two hertz. As a consequence, the vehicle suspension system needs high performance at these frequencies and directions in order to counteract vibration effectively.

Very soft cab mounts can provide attenuation in this low frequency range (one to ten hertz), but have very poor force rejection ability. In other words, a relatively small external force applied to the cab causes the vehicle cab to deflect unacceptably. Other vehicle suspension systems, which are relatively stiff and thus have good force rejection, tend to provide poor low frequency isolation. In many instances, such systems actually amplify the frequency range to which the human body is most sensitive.

It is more desirable to have a suspension system which is hard relative to external forces acting on the vehicle body, but soft to disturbances transferred from the chassis up to the cab, in other words, a hard/soft system. With such a system, the body feels rigid when the operator climbs into the vehicle, but the offending vibrations which would otherwise be transmitted from the chassis to the body are attenuated.

With reference to FIG. 1, a conventional passive suspension system for a vehicle consists of a spring and a damper 7, such as a conventional shock absorber, connected in parallel between the chassis 8 and body 9 of the vehicle. The motion of the body is defined by the expressions:

$$\dot{P} = K\delta + R(V_I - V_O)$$

$$\dot{\delta} = V_I - V_O$$

The transmissibility of the suspension is given by:

$$\frac{V_O}{V_I} = \frac{\left(\frac{R}{M}\right)S + \left(\frac{K}{M}\right)}{S^2 + \left(\frac{R}{M}\right)S + \left(\frac{K}{M}\right)}$$

where M is the mass of the body, K is the stiffness of spring 6, R is the damping coefficient R of the damper 7, $V_O$ is inertial velocity of the body mass, $V_I$ is the inertial velocity of the chassis disturbance, and s is the Laplace variable.

A trade-off exists in the design of this simple spring and damper suspension system. In order to isolate vibrations at relatively high frequencies above the suspension's natural frequency, it is desirable to reduce the damping coefficient R. However, such a system tends to resonate, as an automobile with badly worn and ineffective shock absorbers, thereby producing a very springy ride. Increasing the damping coefficient to overcome the springy ride problem decreases isolation above the suspension's natural frequency.

Previous attempts to avoid this trade-off employed a dynamically altered control force applied across the suspension. In that system the force Fc exerted by the damper varied in proportion to the mass velocity. The motion of the mass in that system is defined by the expressions:

$$\dot{p} = K\delta + RV_O$$

$$\dot{\delta} = V_I - V_O$$

Thus the dependence on the motion of the chassis has been removed. The transmissibility of the suspension is given by:

$$\frac{V_O}{V_I} = \frac{\left(\frac{K}{M}\right)}{S^2 + \left(\frac{R}{M}\right)S + \left(\frac{K}{M}\right)}$$

As evident from the above transmissibility function, the feedback from the sensed mass motion affects only the damping term in the denominator, eliminating the trade-off between dampening at resonance and isolation above the suspension's natural frequency.

SUMMARY OF THE INVENTION

A general object of the present invention is to provide a vibration isolation system which produces motion that opposes, thereby nullifying, disturbance motion applied by the vehicle body to the operator seat.

A further object is to monitor and control relative motion to provide good reference tracking in the presence of actuation non-linearities.

These and other objectives are satisfied by replacing the dampening element of a conventional passive suspension with an appropriately controlled actuator. That actuator, such as a hydraulic cylinder and piston for example, is connected between the seat and vehicle body to produce motion which counteracts influence of vehicle body motion at the seat. A spring, such as an air bag device for example, also is connected between the seat and the vehicle body and provides an off-loading force which is variable to compensate for differing masses placed on the seat. By varying the spring preload, or pressure in the case of an air spring, the static force exerted on the actuator, by persons of different weights sitting on the seat, may be maximized. This enables the actuator to function effectively over a wide range of operator masses, without undue power drain on the vehicle.

An inertial motion sensor detects movement of the seat along the isolation axis producing a proportional signal. A force sensor which produces a force signal indicating the magnitude of force exerted on the actuator by the seat and the operator. A controller responds to the motion signal by commanding the actuator to nullify effects of the movement of the vehicle body from acting on the seat. The controller also responds to the force signal by varying the spring preload to maintain the average force exerted on the actuator within a predefined range.

The preferred embodiment of the active suspension system includes a displacement sensor which detects an amount of displacement of the seat with respect to the vehicle body. The controller also responds to the motion signal in operating the actuator.

BRIEF DESCRIPTION OF THE DRAWINGS

FIG. 4 is a side view of an alternative scissors type seat suspension system;

FIG. 5 is a side view of a parallelogram type seat suspension system incorporating the present invention;

DETAILED DESCRIPTION OF THE PREFERRED EMBODIMENTS

Figure 2:
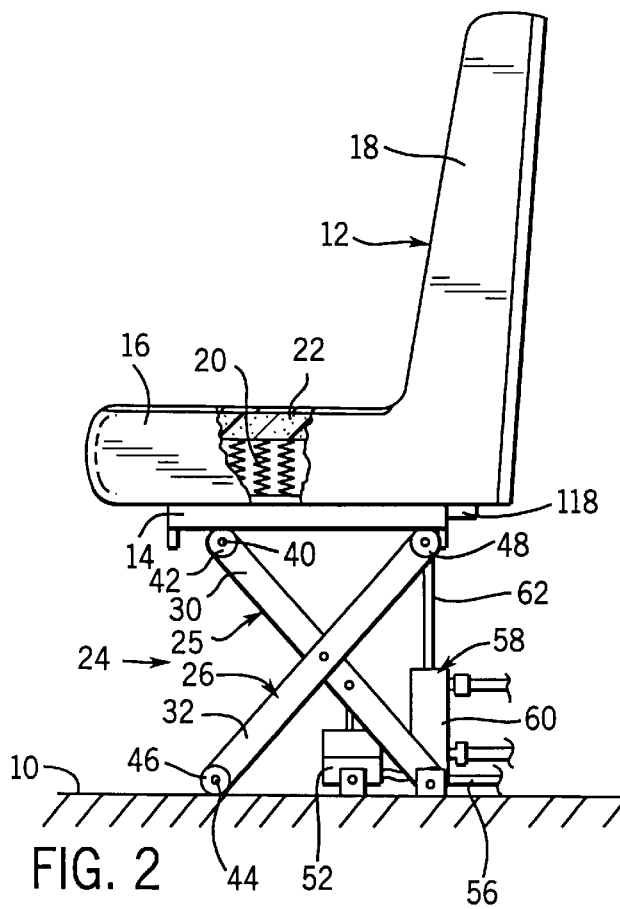
FIG. 2 is a side view of a seat for an operator of a vehicle and a scissors type seat suspension system that incorporates the present invention.
Figure 3:
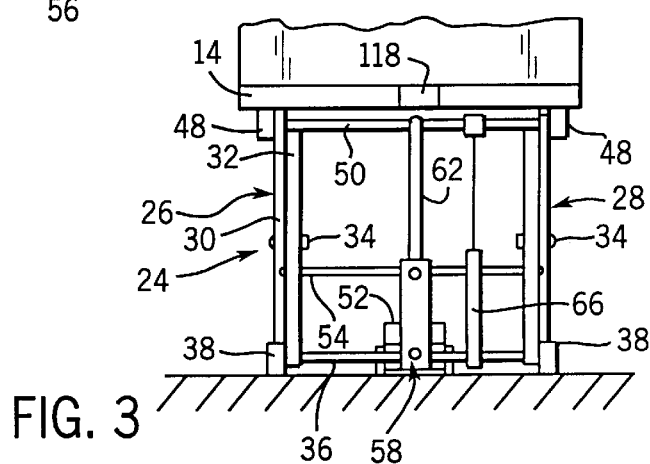
FIG. 3 is a rear view of the seat and suspension system in FIG. 1.

With initial reference to FIGS. 2 and 3, a motor vehicle, such as agricultural or construction tractor, has a body 10 with a seat 12 upon which an operator sits while operating the motor vehicle. The seat has a frame 14 which supports a seat cushion 16 and a back cushion 18 which are of standard construction. That is the seat cushion 16 may have an internal springs 20 on top of which is a resilient pad 22,of foam rubber for example. The seat is covered with a decorative fabric. Springs 20 and/or resilient pad 22 provide some degree of passive vibration isolation between the occupant of the seat and the body of the vehicle.

The frame 14 of seat 12 constitutes a relatively small mass which is supported from the vehicle body by a suspension 24 formed by a linkage 25 that comprises two scissor mechanisms 26 and 28 located on opposite sides of the frame 14 which allow the seat to move up and down. Each scissor mechanism 26 and 28 comprises first and second elongated braces 30 and 32 pivotally connected at their mid-points by a pin 34. One end of each first brace 30 is pivotally attached by a rod 36 to brackets 38 fixed to the body 10. The other ends of the first braces 30 have a first axle 40 extending therethrough with a pair of rollers 42 attached to the ends of the first axle and riding against the underside of the frame 14. A second axle 44 extends between one end of each second brace 32 and has a roller 46 at each end which ride on the vehicle body 10. The opposite ends of the second braces 32 either are pivotally attached to the seat frame 14 or have a third axle 50 with rollers 48 that engage the seat frame. In this latter case, a structural element (not shown) is provided which captivates the rollers 42 and 48 against the frame 14 thereby preventing the seat 12 from being detached from the suspension 24.

An air spring device 52, of a type commonly used as a spring in truck axle suspensions and passive seat suspensions, is connected between the vehicle body 10 and a component of the seat suspension 24. Specifically, the air bag suspension device 52 is pivotally attached to the body 10 and to a rod 54 that extends between both first braces 30. Preferably, this device 52 is centered between the two scissor mechanisms 26 and 28. The air bag suspension device 52 has an internal bladder which is inflated with air supplied through a hose 56 from a source 126 (FIG. 3) of compressed air. By inflating and deflating the bladder in a controlled manner, the nominal load on the air spring is adjusted. The air pressure in the bladder is changed in correspondence with the weight of the seat occupant, as will be described, to vary the preload which is exerted on the spring during static conditions, e.g. when the vehicle is at rest.

A stiff actuator 58, such as a hydraulic cylinder 60 and piston 62, is pivotally coupled to both the third axle 50 and the rod 36 of the seat suspension 24. Preferably the hydraulic stiff actuator 58 is centered between the two scissor mechanisms 26 and 28. The piston 62 internally divides the cylinder 60 into upper and lower chambers to which hydraulic fluid is supplied and relieved to actively raise and lower the seat 12. As will be described, the flow of hydraulic fluid is controlled so that the motion produced by the stiff actuator 58 counteracts vibrational movement from the vehicle body 10.

A displacement sensor 66 is pivotally coupled to both the third axle 50 and the rod 36 of the seat suspension 24 parallel to the hydraulic stiff actuator 58. The displacement sensor 66 produces an electrical signal which indicates the amount of displacement δc, i.e. the distance, between the body 10 and seat frame 14.

FIG. 4 illustrates another embodiment of a scissor type seat suspension 70. In this version the hydraulic actuator 72 is pivotally coupled to the second axle 44 and to a rod 74 that extends between both second braces 32 at the front of seat suspension 70. A displacement sensor 66 is connected between the third axle 50 and the seat frame 14 and provides an electrical signal indicative of the displacement there between. An air bag suspension device 76 is connected between the vehicle body 10 and a rod extending across from one scissor mechanism to the other. This air bag suspension device 76 is pivotally connected to the vehicle body or has wheels 78 which ride on the body. Alternatively the stiff hydraulic actuator 58 and the air bag suspension device 52 may be connected directly to braces 30 and 32 of one scissor mechanism 26 or 28.

FIG. 5 shows the application of the present invention to a parallelogram type seat suspension 80. In this case a first post 82 is fixedly attached to the seat frame 14 and a second post 84 is fixedly attached to the vehicle body 10. Two cross bars 86 and 88 are pivotally connected in parallel between the first and second posts 82 and 84. An air bag suspension device 92 is pivotally connected between the vehicle body 10 and a the lower cross bar 86. A stiff hydraulic actuator 90 is pivotally coupled to both the first post and the vehicle body. Alternatively the locations of the stiff hydraulic actuator 90 and the air bag suspension device 92 could be interchanged. Although not visible in FIG. 5, an displacement sensor is connected in parallel with the stiff hydraulic actuator 90 to provide an electrical signal indicative of the distance between the seat frame 14 and the vehicle body 10.

Figure 1:
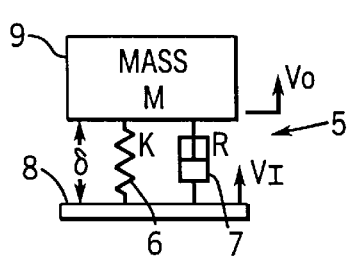
FIG. 1 is a schematic representation of a prior art vibration isolator that incorporates a spring and a damper.
Figure 6:
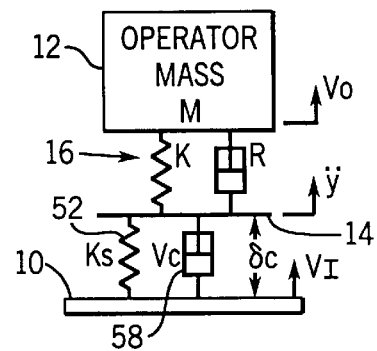
FIG. 6 is a schematic representation of a vibration isolation system according to the present invention.

FIG. 6 is a schematic representation of the present motor vehicle seat vibration isolation system and applies to all the preceding embodiments of the mechanical mechanism that supports the seat 12. The characteristics of the vibration isolation system are defined by the operator mass M on the seat 12, the stiffness K and the damping coefficient R of the seat cushion 16, the stiffness Ks of the air bag suspension device 52 which does not affect idealized isolation—only the power consumption of the hydraulic actuator 58, and the input velocity Vc of that hydraulic actuator. The low frequency acceleration ÿ transmitted to the seat frame 14 is given by the expression: ÿ=V̇$_I$+δc, where V̇$_I$ is the acceleration of body 10 and δc is the second integral of the displacement δc.

Regardless of whether a scissors, parallelogram, or some other type of mechanical mechanism is employed to support the seat 12 the same type of control system can be used to operate the stiff hydraulic actuator and control the pressure in the air bag suspension device. For simplicity of explanation the control system and operation of the present invention will be described in the context of the scissor mechanism suspension shown in FIGS. 2 and 3.

Figure 7:
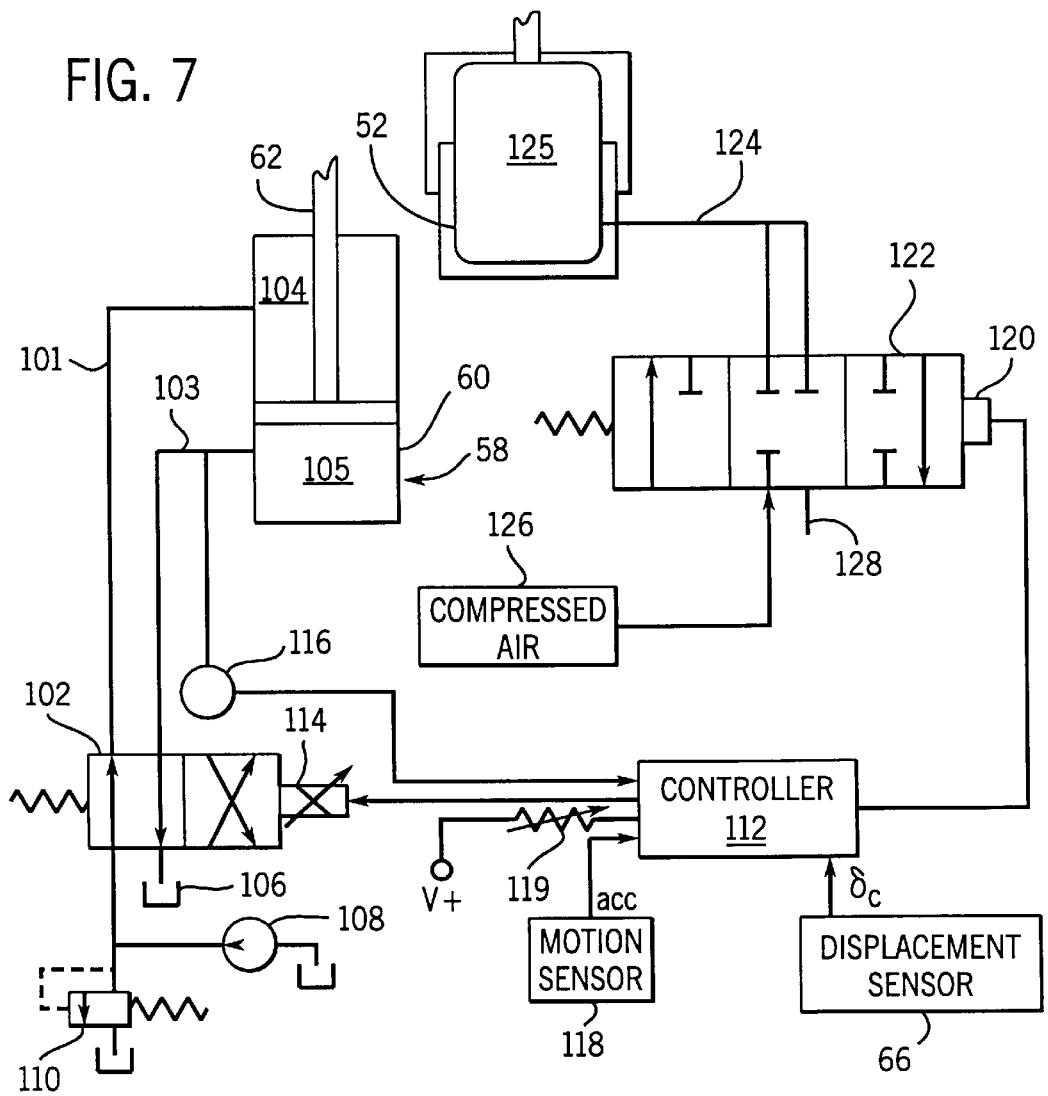
FIG. 7 is a schematic diagram of the control system for the vibration isolation system.

With reference to FIG. 7, the control system 100 has a proportional, directional control valve 102 connected to hydraulic lines 101 and 103 that lead to the upper and lower chambers 104 and 105, respectively, of the cylinder 60 for stiff actuator 58. The four-way type control valve 102 alternately couples these hydraulic lines 101 and 103 to a tank 106 and a standard hydraulic pump 108. For example, the hydraulic pump 108 produces a fluid supply pressure of 250 psi (1.72 MPa) and at a peak flow rate of four gallons per minute (0.06 m³/min.). A conventional pressure relief valve 110 prevents the supply pressure at the pump output from exceeding a safe operating level. Which one of the hydraulic lines 101 and 103 is coupled to tank 106 and which one to the pump 108 is determined by the position of a spool in the proportional, directional control valve 102. That position is in turn determined by signal from a controller 112 that is applied to a valve actuator 114 which drives the control valve spool.

The controller 112 can be implemented with either digital or analog circuits. A pressure sensor 116 is connected to the hydraulic line 103 for the lower cylinder chamber 105 and sends and electrical signal to an input of the controller 112 which indicates the pressure in that chamber. A second input of controller 112 receives a signal from an inertial motion sensor 118, such as an accelerometer, which is fixedly attached to the frame 14 of the seat 12. A velocity sensor or other type of motion detector may be used in place of an accelerometer as the motion sensor 118. A user operable device 119 produces a signal that is applied to a third input of the controller 112, thereby enabling the operator to adjust the height of the seat 12 electro-hydraulically. The signal from the displacement sensor 66 is applied to a fourth input of the controller 112.

An output of the controller 112 is connected to an actuator 120 of a pneumatic control valve 122 which controls the pressure within air bag suspension device 52. Specifically the pneumatic control valve 122 connects an air line 124 from an internal bladder 125 of the air bag suspension device 52 to a source 126 of compressed air or to an exhaust port 128 Operation of the pneumatic control valve 122 into different positions causes the air bag suspension device 52 to inflate or deflate. The air bag suspension device 52 nominally off-loads the static weight of the seat and the operator from the stiff actuator 58. As will be described, this action enables a relatively small stiff actuator operating with a relatively low hydraulic supply pressure to counteract vibrations from affecting even a 200 pound (91 kg) or heavier operator.

Figure 8:
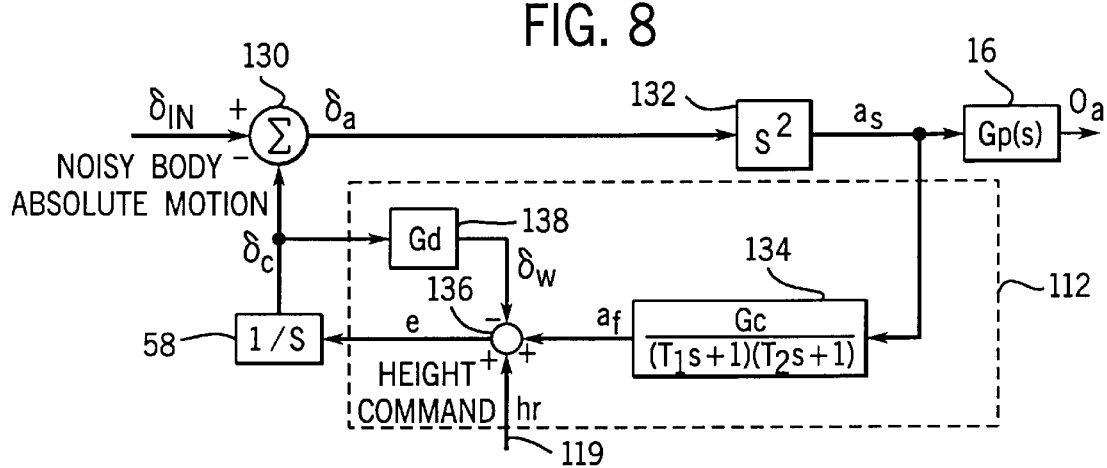
FIG. 8 is a block diagram of the control process employed by the present vibration isolation system.

FIG. 8 is a functional block diagram of the vehicle seat suspension system. Displacement δ$_{IN}$ represents the disturbance motion of the vehicle body 10 as applied to the seat suspension 24. As will be described, this body motion is destructively summed with the controlled counteracting displacement δ$_c$ produced by the hydraulic actuator acting on the seat frame 14 as depicted by element 130 in the functional diagram. The sum of these motions produces an absolute "quiet platform motion" δa of the seat frame 14. For the exemplary system, the plant is depicted by double differentiation at block 132 which results in an acceleration a$_s$ of the seat frame 14. This acceleration is acted upon by the passive isolation Gp(s) provided by the seat cushion 16 resulting in an acceleration Oa of the operator sitting on the seat 12. Ideally, the operator acceleration Oa is minimal due to operation of the vibration isolation system.

The seat frame acceleration a$_s$, as scaled by sensitivity of the motion sensor 118 is applied to the second input of the controller 112. Another dynamic input to the controller 112 is a signal representing controlled relative displacement δc of the seat frame 14 with respect to the vehicle body 10 as provided by displacement sensor 66. The controller 112 at functional block 134 compensates the motion sensor, e.g. accelerometer, signal a$_s$ according to the expression:

$$a_f = a_s\left(\frac{Gc}{(\tau_1 s + 1)(\tau_2 s + 1)}\right)$$

where $\tau_1$ has a typical value of 0.80 seconds, $\tau_2$ has a typical value of 0.05 seconds, and gain Gc is pragmatic depending upon the gains of the hydraulic valve, stiff actuator, sensor and other components in the specific control system. This function produces a compensated acceleration signal a$_f$ to which a seat height command hr produced from user operable device 119 is added and from which a weighted displacement signal δ$_W$, is subtracted to produce an error signal e at functional block 136.

The error signal e controls the actuator 114 that drives the hydraulic control valve 102 shown in FIG. 7 and results in a flow of hydraulic fluid to and from the cylinder 60 which produces movement of the piston 62. This action of the stiff actuator 58 causes relative displacement δ$_c$ of the operator seat 12 with respect to the vehicle body which tends to null the disturbance motion δ$_{IN}$.

The relative displacement δ$_c$ is sensed by the displacement sensor 66 and applied to an input of the controller 112. The controller 112 at functional block 138 applies a gain Gd to scale this relative displacement input signal and produce the weighted displacement signal δ$^w$ that is subtracted from the compensated acceleration signal a$_f$.

Consequently the closed loop displacement dynamics, from a$_f$ to δ$_c$, are that of a first order low-pass filter. Typical selections for gains Gc and Gd result in a closed loop displacement bandwidth of 3 Hz. At frequencies below the displacement loop bandwidth, the sensed displacement tracks the reference signal $a_f$ formed by the filtered inertial sensor signal. Beyond the closed loop displacement bandwidth, feedback has a diminishing effect on the output and the relative velocity of the stiff actuator 58 tracks the reference signal $a_f$ in an open loop sense.

An important feature of the present vibration isolation system is the use of an adjustable air bag suspension device 52 to off-load the static weight of the operator and seat from the hydraulic stiff actuator 58. Although a suitably sized fixed spring may be utilized, controlling the air pressure in the air bag suspension device 52 provides flexibility required to handle a large range of operator weights. The static weight off-loading enables the stiff actuator size and the hydraulic power required to operate that actuator to be reduced. The operation of the air bag suspension device 52 is governed by the controller 112. Specifically, the pressure of the hydraulic fluid in the lower chamber 105 of the cylinder 60 is sensed by sensor 116 and after low pass filtering provides a signal, indicative of the static weight being exerted on the stiff actuator 58, which is available for determining off-load control action.

Preferably, the measured pressure in the lower chamber 105 should be approximately 50% of the supply pressure from pump 108. If the measured pressure is outside a defined range centered at this mid pressure, the inflation of the air bag suspension device 52 is adjusted until the measured pressure is equal to one-half the supply pressure. To do so, the controller 112 first compares the measured pressure to an upper threshold, for example 60% of the supply pressure from pump 108. If the measured pressure is above the upper threshold, the controller 112 sends a control signal to the air valve actuator 120 which moves the air valve 122 into a position where compressed air from source 126 is fed to the bladder 125 until the measured pressure in the lower chamber 105 of the hydraulic stiff actuator 58 decreases to 50% of the pump supply pressure. When the measured pressure is below the upper threshold, the controller 112 then compares the measured pressure to a lower threshold, for example 40% of the supply pressure from pump 108. If the measured pressure is below the lower threshold, the controller 112 sends a control signal to the air valve actuator 120 which moves the air valve 122 into a position where the bladder 125 is deflated by releasing air through exhaust port 128 until the measured pressure in the lower chamber 105 of the hydraulic stiff actuator 58 increases to 50% of the pump supply pressure.

I claim:

1. An active suspension system for isolating a seat of a vehicle from motion disturbances of the vehicle body, said active suspension system comprising;
    a linkage by which the seat is attached to and supported by the vehicle body in a manner that enables movement of the seat along a given axis with respect to the vehicle body;
    an actuator connected between the seat and the vehicle body to produce motion of the seat which counteracts influence of the motion disturbances of the vehicle body;
    a spring connected between the seat and the vehicle body and having a preload which is variable to compensate for differing masses placed on the seat;
    a motion sensor detects movement of the seat along the given axis and produces a motion signal in response thereto;
    a force sensor which produces a force signal indicating a magnitude of force exerted on the actuator by the seat and an operator in the seat; and
    a controller which responds to the motion signal by operating the actuator to nullify effects of the motion disturbances of the vehicle body from acting on the seat, and which responds to the force signal by varying the preload of the spring to maintain the force within a predefined range.

2. The active suspension system as recited in claim 1, wherein the actuator is a hydraulic cylinder; and a piston moveable with respect to a cylinder.

3. The active suspension system as in claim 2, wherein the force sensor senses pressure within the hydraulic cylinder.

4. The active suspension system as recited in claim 1, wherein the actuator comprises a hydraulic cylinder; a piston; and a first valve operable by the controller to selectively supply a pressurized fluid from a first external source to the cylinder and to selectively relieve pressurized fluid from the cylinder, causing the piston to move relative to the cylinder.

5. The active suspension system as in claim 4 wherein the force sensor senses pressure within the hydraulic cylinder.

6. The active suspension system as recited in claim 5, wherein the spring comprises an air bag; and a second valve operable by the controller to selectively supply a pressurized gas from a second external source to the air bag and to selectively relieve pressurized gas from the air bag thereby altering preload of the spring; wherein the controller operates the second valve to control the pressured gas in the air bag so that the pressure within the hydraulic cylinder is substantially one-half a maximum pressure of pressurized fluid available from the first external source.

7. The active suspension system as recited in claim 1, wherein the spring is an air bag and the controller varies the pressure of a gas within the air bag in response to the force signal thereby maintaining the force exerted on the actuator within a predefined range.

8. The active suspension system as recited in claim 1, wherein the spring comprises an air bag; and a valve operable by the controller to selectively supply a pressurized gas from an external source to the air bag and to selectively relieve pressurized gas from the air bag thereby altering preload of the spring.

9. The active suspension system as recited in claim 1, wherein the linkage comprises a parallelogram suspension.

10. The active suspension system as recited in claim 9, wherein the parallelogram suspension comprises a first support member attached to the seat; a second support member attached to the vehicle body; and two parallel cross bars pivotally attached to both the first and second support members.

11. The active suspension system as recited in claim 1, wherein the linkage comprises two scissor mechanisms connected to the seat and to the vehicle body.

12. The active suspension system as recited in claim 1, wherein the spring is connected to the vehicle body and the linkage.

13. The active suspension system as recited in claim 1, wherein the actuator is connected to the vehicle body and the linkage.

14. The active suspension system as recited in claim 1, further comprising a displacement sensor which detects an amount of displacement of the seat with respect to the vehicle body.

15. The active suspension system as recited in claim 1, wherein the controller produces a compensated motion signal $a_f$ according to the expression:

$$a_f = a_s\left(\frac{Gc}{(\tau_1 s + 1)(\tau_2 s + 1)}\right)$$

where $a_S$ is the motion signal, and Gc is a gain factor which is a function of gains of the actuator and the motion sensor.

16. The active suspension system as recited in claim 15 wherein $\tau_1$ has a value of substantially 0.80 seconds and $\tau_2$ has a value of substantially 0.05 seconds.

17. The active suspension system as recited in claim 15:
further comprising a displacement sensor which detects an amount of displacement of the seat with respect to the vehicle body and in response produces a displacement signal; and
wherein the controller combines the compensated motion signal $a_f$ with the displacement signal to produce an error signal which controls the operation of the first valve.

18. An active suspension system for isolating a seat of a vehicle from motion disturbances of the vehicle body, said active suspension system comprising:
a support by which the seat is connected to the vehicle body and enabling movement of the seat along a given axis with respect to the vehicle body;
a hydraulic actuator connected between the seat and the vehicle body to produce motion which counteracts influence of the motion disturbances of the vehicle body on the seat;
an air bag connected between the seat and the vehicle body and having a spring preload which is variable to compensate for differing masses placed on the seat;
a motion sensor which detects movement of the seat along the given axis and produces a motion signal in response to detected movement;
a displacement sensor which detects an amount of displacement of the seat with respect to the vehicle body
a force sensor which produces a force signal indicating a magnitude of force exerted on the actuator by the seat and an operator in the seat; and
a controller connected to the force sensor, the motion sensor and the displacement sensor, wherein the controller responds to the motion signal by operating the actuator to nullify effects of the motion disturbances of the vehicle body from acting on the seat, and responds to the force sensor by varying the spring preload of the air bag to maintain the force exerted on the actuator to within a predefined range.

19. The active suspension system as recited in claim 18 further comprising a valve operable by the controller to supply a pressurized gas from an external source to the air bag and to relieve pressurized gas from the air bag thereby altering the spring preload.

20. The active suspension system as recited in claim 18 further comprising a flow control valve operable by the controller to supply a pressurized fluid from an external source to the hydraulic actuator and relieve pressurized fluid from the hydraulic actuator thereby tending to produce movement of the seat relative to the vehicle body.

21. The active suspension system as recited in claim 18, wherein the controller produces a compensated motion signal $a_f$ according to the expression:

$$a_f = a_s\left(\frac{Gc}{(\tau_1 s + 1)(\tau_2 s + 1)}\right)$$

where $a_S$ is the motion signal, and Gc is a gain factor which is a function of gains of the actuator and the motion sensor; and combines the compensated motion signal $a_f$ with a signal from the displacement sensor to produce an error signal which controls the operation of the hydraulic actuator.

22. A seat assembly for a motor vehicle which nullifies motion disturbance of a vehicle body, said seat assembly comprising;
a frame;
a resilient seat cushion attached to the frame and forming a passive vibration isolator;
a support by which the frame is connected to the vehicle body and enabling movement of the frame along a given axis with respect to the vehicle body;
an active vibration isolator comprising an actuator and a spring connected between the frame and the vehicle body, wherein the actuator produces motion of the frame which counteracts influence of the motion disturbances of the vehicle body, and the spring connected has a preload which is variable to compensate for differing masses placed on the seat cushion;
a motion sensor connected to the frame to detect movement along the given axis and produce a motion signal in response to detected movement;
a force sensor which produces a force signal indicating a magnitude of force exerted on the actuator; and
a controller which responds to the motion signal by operating the actuator to nullify effects of the motion disturbances of the vehicle body from acting on the seat, and which responds to the force signal by varying the preload of the spring to maintain the force within a predefined range.

23. The seat assembly as recited in claim 22, wherein the actuator comprises a hydraulic cylinder; a piston; and a first valve operable by the controller to selectively supply a pressurized fluid from a first external source to the cylinder and to selectively relieve fluid from the cylinder, so as to cause the piston to move relative to the cylinder.

24. The seat assembly as in claim 23 wherein the force sensor senses pressure within the hydraulic cylinder.

25. The seat assembly as recited in claim 24, wherein the spring comprises an air bag; and a second valve operable by the controller to selectively supply a pressurized gas from a second external source to the air bag and to selectively relieve pressurized gas from the air bag thereby altering preload of the spring; wherein the controller operates the second valve to control the pressured gas in the air bag so that static pressure within the hydraulic cylinder is substantially one-half a maximum pressure of pressurized fluid available from the first external source.

26. The seat assembly as recited in claim 22 wherein the support comprises a parallelogram suspension.

27. The seat assembly as recited in claim 22 wherein the support comprises two scissor mechanisms connected to the frame and to the vehicle body.

* * * * *